Nov. 14, 1967  D. B. ANDERSON  3,353,180
MONOPULSE DATA SYSTEM
Filed April 16, 1963  6 Sheets-Sheet 4

*INVENTOR.*
DEAN B. ANDERSON
BY
ATTORNEY

FIG. 10

INVENTOR.
DEAN B. ANDERSON

FIG. 11

3,353,180
MONOPULSE DATA SYSTEM
Dean B. Anderson, Whittier, Calif., assignor to
North American Aviation, Inc.
Filed Apr. 16, 1963, Ser. No. 273,395
15 Claims. (Cl. 343—16)

This invention relates to monopulse angle detection systems and more particularly to means for obtaining additional information from dual plane monopulse energy systems.

In conventional radar systems for providing signals indicative of the range of a detected target, directional antennas utilizing electrical scanning or physical drive mechanisms have been used to provide target angle information. Where the target angular size (as viewed from the receiving antenna) is very large relative to both the antenna beamwidth and the angular resolution of the antenna scanning means, then the scanning antenna may also be used to provide information concerning the target angular size or transverse extent, such as the azimuth extent, for example, in a PPI display. In the prior art, the use of a nodding antenna (e.g., scanning in elevation) in cooperation with an azimuth scanning means has been used to provide both elevation and azimuth *extent* information (as well as both elevation and azimuth *position* information) regarding targets whose sizes are large relative to the beamwidth of the receiving antenna.

Where the angular size or extent of the detected target (as viewed from the receiving antenna) is small relative to the antenna beamwidth, such beamwidth limits the accuracy of, and even prevents, the determination of target extent by the above described scanning means. However, the location or target angle of a small target lying *within* the beamwidth of the antenna may be determined relative to the antenna boresight or radiation axis of symmetry by well-known monopulse signal techniques.

Tracking and armament control applications of monopulse signal systems such as monopulse radars conventionally employ three types of information: (1) A sum signal representing the sum of four signals from each of four antenna apertures or horns, (2) an azimuth difference signal, and (3) an elevation difference signal. These three types of signals are employed by a monopulse computer in the computation of tracking angles and range information to define the position of a target relative to the monopulse radar.

The use of a four-horn antenna feed arrangement, the excitation of each horn of which is mutually equal and in-phase, provides tracking angle information in two mutually orthogonal planes (both intersecting the boresight axis of the radar antenna), and is referred to as a dual-plane system. Such dual-plane systems are described more particularly in co-pending U.S. application No. 157,308, filed December 1, 1961, now Patent No. 3,185,982, by Robert O. Case and Claude H. Child, assignors to North American Aviation, Inc., assignee of the subject application; and in U.S. Patent No. 2,933,980, issued April 26, 1960 to Moore et al., particularly in FIG. 3 and in "Introduction to Monopulse" by Rhodes, published by McGraw-Hill (1959), particularly in chapter 4. The four-horn antenna feeds employed with such dual-plane systems may be either of the phase-sensing type which has the phase centers of two apertures spaced apart from the phase centers of the remaining two apertures, or of the amplitude sensing type which has the phase centers of two apertures not spaced apart from the phase centers of the other two apertures, or may employ one type in one of the two mutually orthogonal planes and the other type in the second plane, as is described in U.S. patent application No. 709,729, filed January 16, 1958, now Patent No. 3,071,-769, by Randall et al., assignors to North American Aviation, Inc., assignee of the subject patent application.

Such mutually orthogonal dual-plane systems variously combine the received pulse echoes in the four channels of the antenna feed structure to provide: a first and second difference channel respectively for determining azimuth and elevation target angles respectively, and a sum signal in a fourth channel both for indicator display functions and for determining target range. A third difference signal in the third channel has been conventionally dissipated in a matched load, as described for example on page 71 of the above mentioned "Introduction to Monopulse," and the above mentioned co-pending U.S. patent application No. 709,729, filed January 16, 1958. Hence, conventionally only target range and mutually orthogonal target angle information are obtained from a dual-plane monopulse receiving system. (Of course, where the angular size of the target is large relative to the beamwidth of the combined four-horn beam or sum signal pattern, mechanical scanning means in cooperation with the antenna assembly may be employed to provide information as to target extent, which information is of limited accuracy in the scanning plane).

For small targets whose size or extent is small relative to, and which lie wholly within, the antenna beamwidth, a difference signal in one of the dual-planes (say, the azimuth difference signal) may be phase-detected relative to the sum signal to provide a resultant signal indicative of the sense of the target (azimuth) angle-off-boresight, (the boresight being the longitudinal axis of symmetry of the combined or sum signal radiation pattern). More precise information as to such target angle may be obtained by employing automatic gain control means responsive to the sum signal in combination with a selected one of the two conventional difference signals of the dual-plane system to normalize such difference signal (which, in effect, constitutes an analog dividing device, obtaining the quotient of the difference signal divided by the sum signal) thereby providing a resultant signal indicative of the magnitude of target angle (and independent of the signal strength of the detected target). Such processing of the sum ($\Sigma(u)$) and difference ($\Delta(u)$) signals for target angle detection is referred to as a Class I angle detector, and is associated with the *real* component of the additive sensing function, $$R_e F = \frac{\Delta(u)}{\Sigma(u)}$$

as described, for example, at pages 56 and 57 of the above mentioned text "Introduction to Monopulse." The term "real component" refers to the component which is *in phase* with the sum signal. Two other types of angle detectors, classified as Classes II and III, are associated with the *real* component of the multiplicative sensing functions, $R_e F = \log p(u)$ and $R_e F = \sin \phi(u)/2$, respectively, as described in "Introduction to Monopulse."

Hence, the prior art improvements in dual-plane monopulse receiver systems have provided limited means for generating and displaying information concerning target range and target angle information; and, (for target sizes which are *large* relative to a scanning beam) target shape and size or extent.

Other information available from the target "signature" or received echoes of a target (which is small relative to monopulse energy beamwidth in a dual-plane monopulse system) relates to the measure of target size, shape and rotation. Further, such information is particularly useful in the detection and identification of offensive targets such as enemy ballistic missiles and in distinguishing a warhead separation from the rest of the missile or from clutter-generating counter-measure devices or decoy targets.

The concurrent presence of point source radiators or targets lying within the monopulse receiver antenna beamwidth at aproximately the same range from the receiver, and separated in target angle, produces a mutual interference signal. This mutual interference phenomenon arises from the fact that the *almost* ranges of the randomly occurring point source scatterers of an actual target surface of finite size actually differ by less than an amount equivalent to the pulse width of the monopulse illuminating energy. In other words, the occurrence of such point source scatterers at an angular separation lying within the resolution limit of the antenna beamwidth and at a range separation lying within the range resolution limit of the monopulse system, causes a phenomenon characterized by a composite target signal which can be resolved into a component signal having an odd distribution (as well as an even distribution component signal). This means that the odd distribution signal is manifested in the difference signal channel of a monopulse receiver. This odd distribution interference signal, in turn, includes two components: a real component (in phase with the conventional monopulse sum signal) and a quadrature component (in time-phase quadrature with the conventional monopulse sum signal), which latter quadrature difference signal component represents the aspect of the interference phenomenon which is of interest in the concept of the subject invention. The quadrature portion of the odd or difference signal component produced by the mutual interference phenomenon is substantially uneffected by the magnitude and sense of the angles-off-boresight of the several mutually interfering point targets or signal sources. Further, the magnitude of the mutual interference phenomenon is a function of the angular distance between the two source producing such phenomenon. Hence, it is to be appreciated that the total real component of a monopulse difference signal is a function of target size and the magnitude and sense of target-off-boresight, whereas the quadrature component of a monopulse difference signal is a function of target size.

Such mutually interfering target signal sources might be comprise, for example, of the opposite extremities of a target having a finite size or angular extent. Now, if the antenna boresight axis (of the monopulse receiver) were centered upon such a composite target (e.g., the target is at zero angle-off-boresight), thereby producing no finite *real* component of the target difference signal due to target angle-off-boresight, there would yet be produced a *quadrature* difference signal having a magnitude indicative of the angular *extent,* or size, of such target. This quadrature difference signal may be detected from the signals received in the monopulse receiver difference channel utilized by the radar indicator or other signal utilizing means. Hence, the concept of the subject invention is the application of monopulse means for measuring the size of a small target, which size is small relative to the beamwidth of the monopulse means.

In a preferred embodiment of the concept of the invention, there is provided a monopulse receiving system employing a multiaperture microwave antenna feed system and labyrinth of hybrid junctions or like means for providing a sum signal, and difference signal. There is also provided means for utilizing a quadrature component of the difference signal to obtain a signal indicative of target size or extent. In a specific embodiment, the quadrature signal would be normalized (divided) by the sum signal.

By means of the above described system, additional information concerning a small target may be extracted from the target return or "signature" by a monopulse receiver. Target tumbling about an axis normal to the target range or radius vector, will cause a periodic modulation of the transverse extent signal generated, for example say, the elevation plane extent and corresponding to an apparent change in elevation length, as viewed from the radar. In a dual-plane monopulse system, target spinning about the target radius vector appears as a periodic modulation of two extent signals indicative of two mutually orthogonal dimensional extent components (its azimuthal length and its elevational length, as viewed from the radar). Hence, in the detection of a warhead upon the terminal maneuver of a ballistic missile, including separation of the warhead from the vehicle, the concept of the invention provides means for distinguishing the warhead from the vehicle and from other counter-measure devices which may be proximate to the warhead in time and space, but which will exhibit different target signatures. Accordingly, it is an object of the subject invention to provide improved monopulse means for distinguishing a target in accordance with its size or shape from among a pluraltiy of targets.

It is another object of the subject invention to provide means for extracting additional information from the target signature detected by a dual-plane monopulse receiver system.

It is still another object of the subject invention to provide monopulse target signature information for distinguishing one of several targets having mutually distinct target signatures including shape, size, spinning and tumbling characteristics.

It is yet another object of the subject invention to provide correlation of the sum and quadrapolar signals of a dual-plane monopulse system receiver.

It is a further object of the subject invention to provide additional target signature information by correlating the sum and quadrapolar signals of a dual-plane monopulse receiver.

These and other objects of the subject invention will become apparent from the following description, taken together with the accompanying figures in which.

Figures 1, 2:
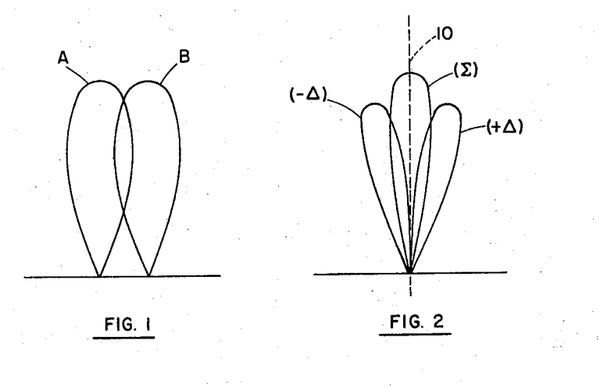
FIG. 1 is an illustration of the antenna patterns of two coplanar apertures of a monopulse antenna.
FIG. 2 is an illustration of the sum and difference of the two patterns of FIG. 1.

Referring to FIG. 1 there is illustrated the two main radiation (and, consequently reception) lobes A and B from the coplanar array of two apertures of a monopulse antenna. In FIG. 2 is illustrated the sum ($\Sigma$) and difference ($\Delta$) respectively of the two patterns A and B of FIG. 1, about the antenna boresight axis 10. The minus sign (—) shown in connection with the difference pattern to the left on the boresight axis (as shown in FIG. 2) serves to indicate the sense or phase reversal of the *real* component of the difference signal ($\Delta$) for a reversal in the sense of the angle-off-boresight of a detected point source target or received point source signal. This sense characteristic is also shown in FIG. 3.

Figure 3:
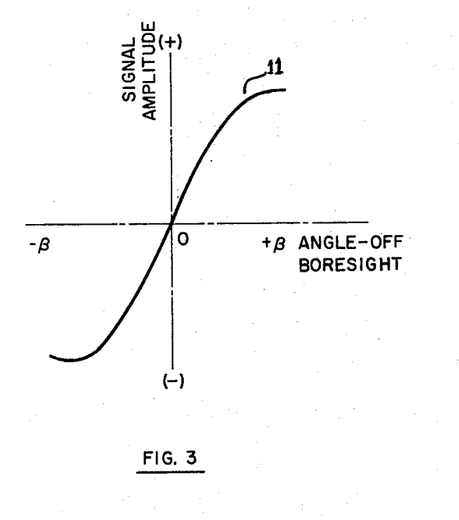
FIG. 3 is a graph of the magnitude of the real or in-phase component of the ratio of the difference to the sum signal of FIG. 2 plotted as a function of angle-off-boresight, $\beta$.

Referring to FIG. 3, there is illustrated a curve 11 of the real function of the ratio (Δ/Σ) of the sum (Σ) and difference (Δ) signals of FIG. 2, plotted as a function of the angle-off-boresight (β) of the small target which produces such signals. Such real function, $$R_e F \frac{(\Delta)}{(\Sigma)}$$

is observed to be an odd function of β, meaning that the function for minus values of β is of like amplitude but of opposite sense to that for corresponding positive values of β. For this reason, such signals are useful in automatic tracking radars for providing control signals for controlling the antenna servos, whereby the antenna is caused to "track" the target. In other words, the error between the antenna boresight and the line of sight to the target, as indicated by the target angle-off-boresight, is used in the servo which drives the antenna to reduce such signal to zero. Hence, the real component of the monopulse difference signals are sometimes referred to in the alternative as monopulse error signals.

Because the real function $R_e F[\Delta/\Sigma]$ of FIG. 3 is an *odd*-real function, it is to be appreciated that for a target of finite size which is centered upon the boresight axis, the real components of the difference signal contributed by components of the target to the left (−β) of the boresight axis would be of opposite sense to the real difference signal components contributed by components of the target to the right (+β) of the boresight axis. In other words, such right and left components of a detected target on boresight tend to be mutually cancelling, whereby the net real target signal for a target of finite size lying on the boresight axis tends to be zero. The quadrature-detected difference signal, however, will be indicative of the size or extent of a small target of finite dimension, as shown in FIG. 4.

Figure 4:
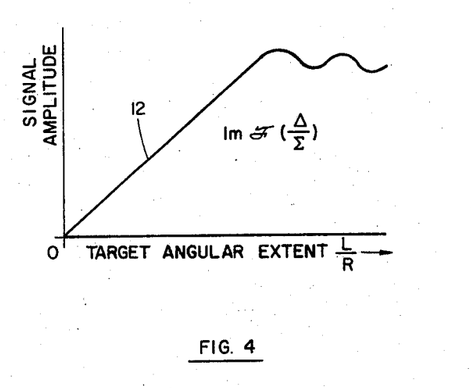
FIG. 4 is a graph of the imaginary, or quadrature, time-phase component of the ratio of the dierence to the sum signals plotted as a function or target angular size, for a target on or near the boresight axis.

Referring to FIG. 4, there is illustrated a curve 12 of the imaginary or quadrature function of the ratio Δ/Σ for the condition:

$$R_e F \frac{(\Delta)}{(\Sigma)} = 0$$

(e.g., target angle-off-boresight equal to zero), plotted as a function of the angular size or extent of the target (as viewed from the receiving antenna). Such quadrature function, $Im F[\Delta/\Sigma]$, is observed to an even function of β, means that components of the target to the left (−β) of the boresight axis cooperate with components to the right of the boresight axis (+β) to generate a signal indicative of the angular distance between them.

Being an even-valued function, the amplitude of target angular extent signal provided by the quadrature component of the monopulse difference signal is essentially independent of the target angular position or angle-off-boresight of the detected target. However, due to the cross-coupling between the real difference signal and the imaginary or quadrature signal in the signal channels due to imperfections in physically realizable phase shifters and phase-detectors employed, it is desirable to employ an antenna tracking loop to cause the system antenna to track the target. In this way, the angle-off-boresight is reduced toward zero; and, hence, the real-component of the difference signal is minimized so as to reduce the effects of cross-coupling of the real difference component signal into the quadrature component difference signal channel.

A signal indicative of target angular extent being obtained, the lineal extent of such target may then be determined by multiplying the angular extent signal by a signal indicative of the range of the target. Means for generating such a signal is shown in FIG. 5.

Figure 5:
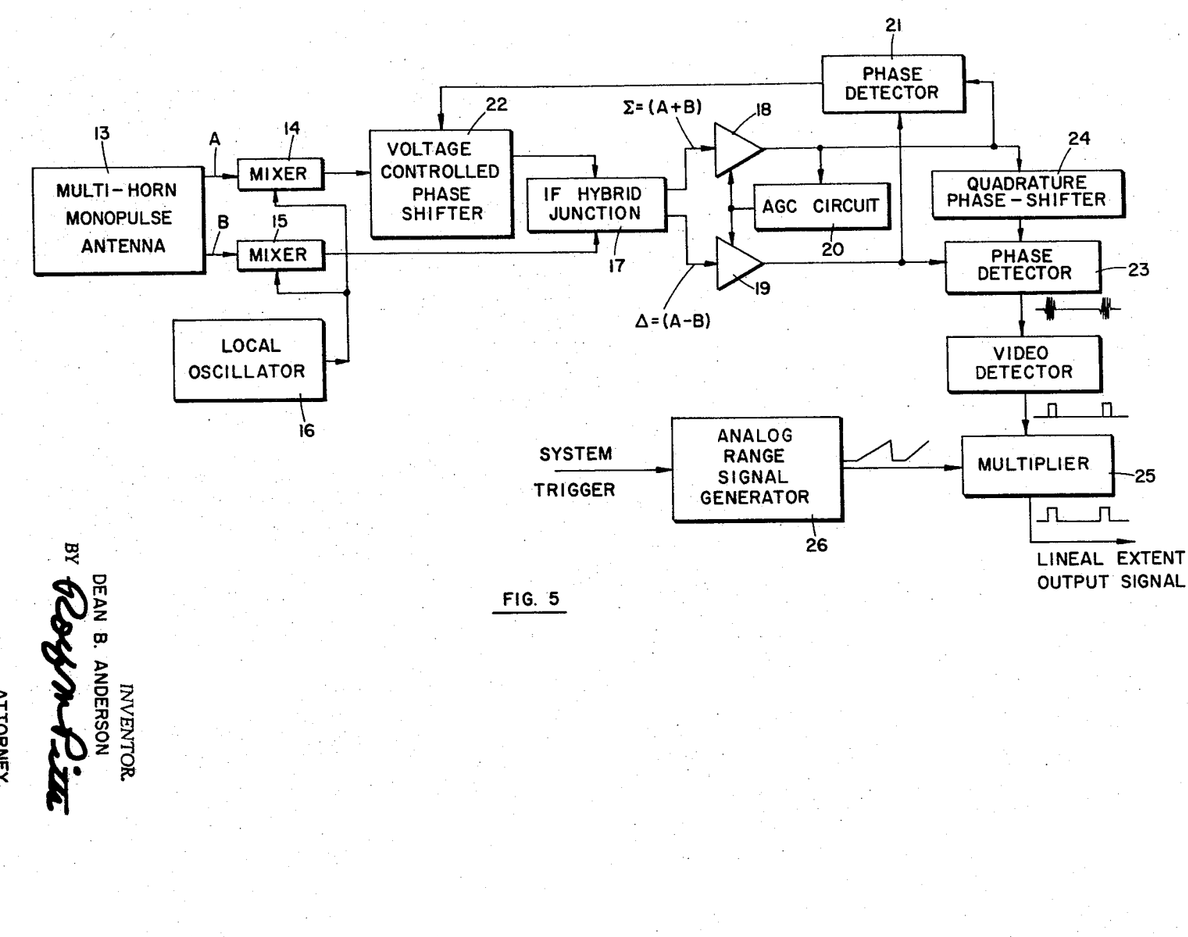
FIG. 5 is a block diagram of a monopulse system embodying the concept of the invention.

Referring to FIG. 5, there is illustrated a block diagram of a monopulse system embodying a concept of the invention. There is provided a monopulse receiving antenna 13 having the usual apertures for providing a first and second received signal, determined by the radiation lobes A and B of FIG. 1. The first and second received signals are fed to a first and second microwave mixer 14 and 15 respectively which cooperate with a local oscillator 16 to reduce the frequency of the received microwave signals to IF signals in a manner well-understood by those skilled in the art, in order that conventional IF techniques and components may be employed for further processing of the received signals.

The first and second IF signals from mixers 14 and 15 respectively are fed to IF hybrid junction 17 or other means for providing a third and fourth output signal indicative of the sum and difference respectively of the inputs thereto. Such device may be constructed and arranged, for example, in a manner similar to the hybrid transformer described and illustrated in U.S. Patent 3,037,173, issued May 29, 1962 to C. L. Ruthroff, or other devices well-known in the art. Accordingly, this element is shown in block form only.

The IF sum and difference output signals from hybrid junction 17 are fed to automatic gain control (AGC) means 18 and 19 respectively, having a common AGC circuit 20 which is responsively connected to the output of sum channel AGC amplifier 18. By means of the above described AGC arrangement, the gains of amplifiers 18 and 19 are continuously adjusted as an inverse function of the signal level of the sum signal, whereby the output of sum channel amplifier 18 is maintained near a constant level and the output of difference channel amplifier 19 is indicative of the ratio of the difference signal to the sum signal. Such structure constitutes well-known analog division technique.

A phase-detector 21 is responsively connected to the outputs of amplifiers 18 and 19 to provide an output signal having an amplitude and sense indicative of component of angle-off-boresight of a detected target, corresponding to the function, $R_e F[\Delta/\Sigma]$ illustrated in FIG. 2. The output of phase sensitive detector 21 may be employed in an antenna servo loop to provide a tracking antenna in a manner well-understood by those skilled in the art. However, where electromechanical actuators are employed for such servo function, the mechanical resolution limits of the associated gear trains, the torque threshold of the actuator motors, and the signal resolution limits of the actuator position pick-off transducers all combine to provide a system hysteresis which limits the minimum angular size or extent of the targets which may thus be accurately tracked. Such inability to accurately maintain the antenna boresight upon the center of the target may, in turn, effect the accuracy of the angular extent measurements sought to be made, as hereinabove described. Accordingly, electronic means responsive to the tracking error signal, $R_e F[\Delta/\Sigma]$, is provided in FIG. 5 for correcting the orientation of the antenna boresight axis.

Such electronic antenna servo loop is provided in FIG. 5 by the cooperation of a voltage-controlled phase-shifter 22 in cooperation with phase sensitive detector 21 for adjusting the phase shift of one of the IF received signals relative to the other. The effect of such phase-shift or time delay upon one of the A and B signal patterns in FIG. 1, tends to skew the sum (Σ) and difference (Δ) patterns of FIG. 2, whereby the angular orientation of boresight axis 10 is altered in FIG. 2 so as to minimize the tracking error signal. In this way, antenna means is provided for accurately tracking a detected target. Alternatively voltage-controlled microwave phase-shift means may be interposed between a microwave output of antenna 10 and an associated input to mixer 14. Such microwave voltage controlled phase-shift means may comprise, for example, a back-biased junction diode or varactor shunted to a waveguide section or other microwave transmission means, the output from phase sensitive detector 21 (in FIG. 5) providing a variable back-bias source.

Means is also provided for generating a signal indicative of the quadrature component of the AGC difference channel output, comprising a second phase sensitive detector 23 responsively connected to the output of amplifiers 18 and 19, and quadrature phase-shift means comprising a 90° phase-shifter 24 interposed at one of the inputs to phase sensitive detector 23 for providing a quadrature time-phase relation thereto relative to the output from an associated one of amplifiers 18 and 19. As illustrated in FIG. 5, for example, phase-shift means 24 is interposed between the output of amplifier 18 and the associated input to phase sensitive detector 23. Hence, the output of phase sensitive detector 23 is indicative of the quadrature component of the difference channel signal for a detected target, and corresponds to the function, $ImF[\Delta]/[\Sigma]$, illustrated in FIG. 3.

The output of phase sensitive detector 23 is indicative of the angular size $(L/R)$, of a detected target. Therefore, the output from phase sensitive detector 23 may be employed to generate a signal indicative of the lineal extent (L), of a detected target by multiplying such output $(L/R)$, by a signal indicative of the range (R), of a detected target. Such computer elements in FIG. 5 are comprised of signal multiplier 25 and range signal generator 26.

Multiplier 25 is responsively connected to the output from each of range signal generator 26 and phase detector 23 to provide an output signal indicative of the product thereof. Range signal generator 26 is responsive to the cyclical system trigger of the monopulse transmitter (not shown) associated with the receiver of FIG. 1, to cyclically provide a saw-tooth or ramp function signal, the amplitude of which at a given instant of time corresponds to the time interval subsequent to the last occurrence of the system trigger. The construction and arrangement of signal multiplier 25 and sawtooth generator 26 are well-known in the art, being described for example in co-pending U.S. application, Serial No. 830,625 for Terrain Clearance Radar filed by William E. Stoney on July 30, 1959, now Patent No. 3,023,804, and assigned to North American Aviation, Inc., assignee of the subject invention. Accordingly, elements 25 and 26 are shown in block form only.

Figure 6:
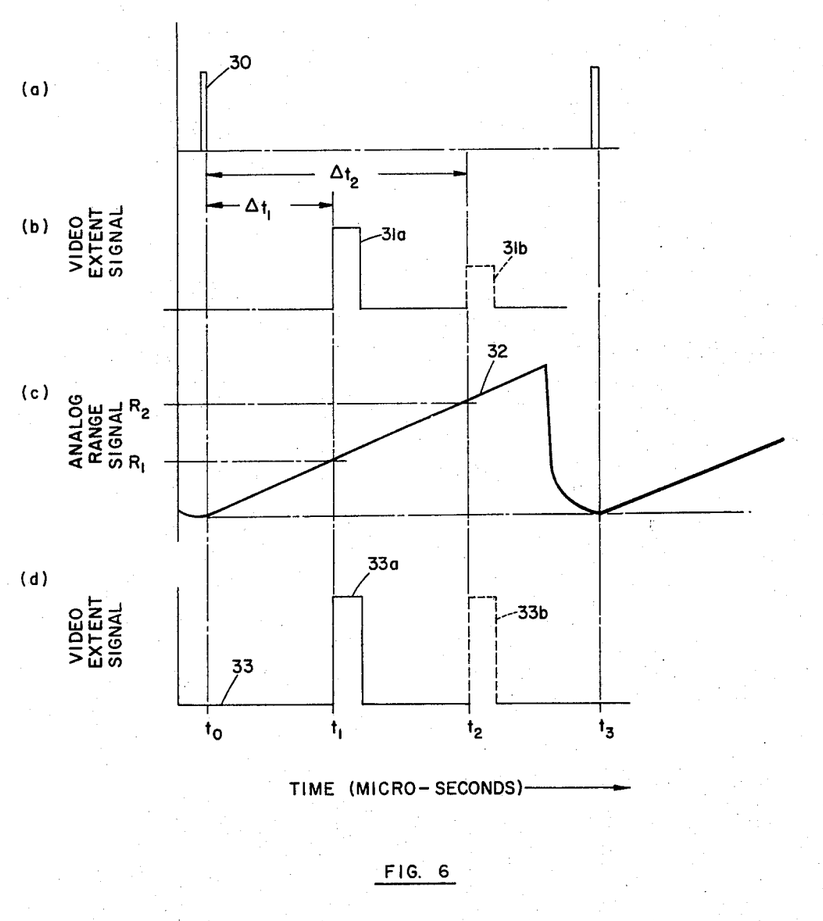
FIG. 6 is a family of time-histories of signals of various elements of the emobdiment illustrated in FIG. 5.

The cooperation of the above described combinaiton of phase sensitive detector 23, multiplier 25 and signal generator 26, to provide a signal indicative of target lineal extent may be more conveniently appreciated by reference to FIG. 6.

Referring to FIG. 6, there is illustrated a family of time histories of signals of several elements of the embodiment illustrated in FIG. 5. Curve 30 represents the cyclically occurring system trigger input to signal generator 26, the occurrence of which corresponds to a reference time $t_0$. Curve 31a represents a video target signal output from phase detector 23 occurring at a subsequent time interval $\Delta t_1$ corresponding to time $t_1$, due to the range ($R_1$) of such detected target, and having a signal amplitude indicative of the angular extent or size of the detected target. Curve 32 represents the ramp output from signal generator 26 as a function of cyclical time. In other words, the response curve 32 for generator 26 is proportional to the range time or the interval $\Delta t_1$ intervening subsequent to the occurrence of the system trigger (curve 30 at $t_0$).

Curve 33 in FIG. 6 represents the output from multiplier 26, and is indicative of the product of curves 31a and 32. It is to be observed from FIG. 6 that a finite multiplier output other than zero (curve 33 at $t_1$ and at $t_2$) occurs only when the inputs to multiplier 25 have finite values other than zero (e.g., curves 32 and 31 at $t_1$ and at $t_2$). In other words, the effect of the video signal be from phase detector 23 to multiplier 24 in FIG. 5 is *both* to gate the output of sawtooth generator 26 *and* to multiply such output as a function of the amplitude of the video gating signal.

Now, because the amplitude of range-time curve 32 at $t_1$ is proportional to the range ($R_1$) of the detected target which produces the video signal curve 31a at $t_1$, the product of curves 31a and 32 at $t_1$ (shown as curve 33a at $t_1$) is indicative of the product of target angle $(L_1/R_1)$ and target range (R). Thus, curve 32 is referred to as an analog range signal, and signal generator 26 is referred to as an analog range signal generator.

Hence, it is to be appreciated that the device of FIG. 5 provides monopulse means for measuring the lineal extent (L) of a detected target, the extent of which is small relative to the beamwidth of the target. Although the device has been illustrated as means for measuring elevation extent, it is clear that the application of the device is not so limited, it being equally adapted to measuring azimuth extent or extent in any desired plane or orientation. Further, it is clear that the concept of the device may be applied to dual-plane monopulse systems to determine target size or extent measurements concurrently in mutually orthogonal planes.

The concept of the invention is particularly useful in airborne ground-mapping systems to selectively distinguish desired terrain features for mapping purposes. For example, signals indicative of targets having a particular vertical or horizontal extent or a combination of vertical and horizontal extent may be employed to gate or attenuate or brighten a ground-mapping display indicator, whereby terrain prominences (such as buildings and vertical communication antennas, and the like) have given extent features (dimensions) may be distinguished from other terrain prominences (such as groves of trees, or small hills) which may have a like backscatter coefficient but which do not display equivalent extent characteristics. In this way, desired ground targets may be located with increased certainty and ease. A suitable embodiment for such an application is illustrated in FIG. 7.

Figure 7:
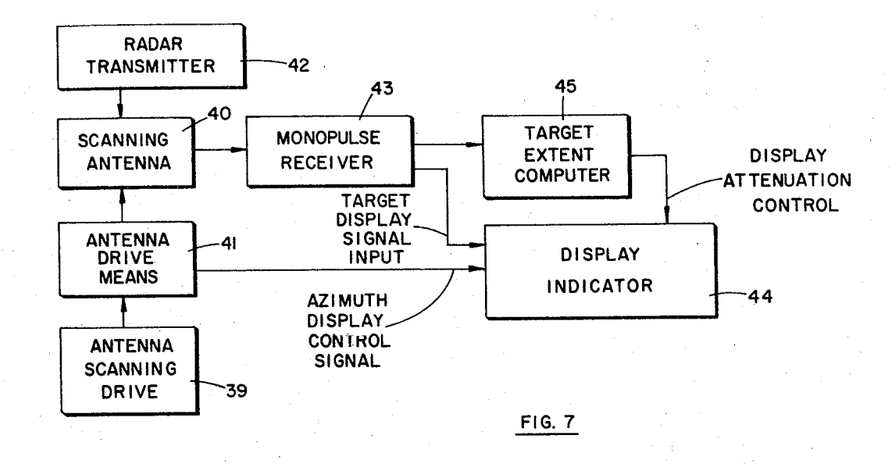
FIG. 7 is a block diagram of an alternate system embodying the concept of the invention.
Figure 8:
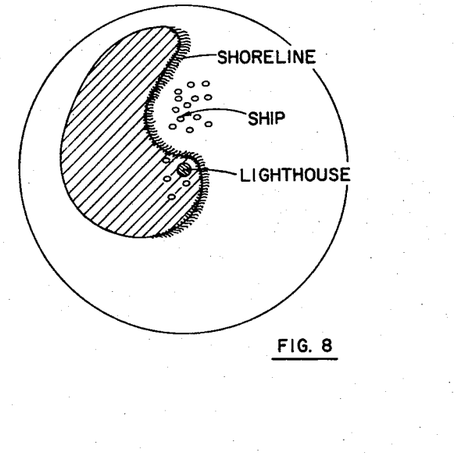
FIG. 8 is an illustration of the display provided by the display indicator of FIG. 7 without benefit of the invention.
Figure 9:
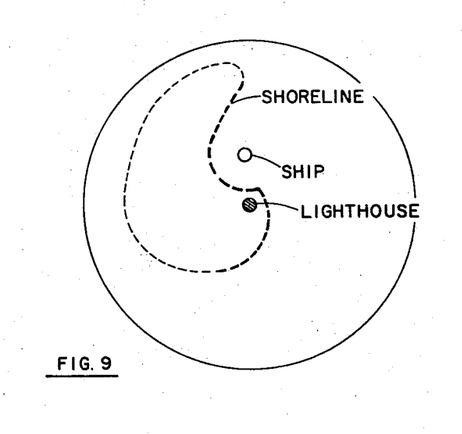
FIG. 9 is an illustration of the improved display provided by the display indicator of FIG. 7 in cooperation with the subject invention.

Referring to FIG. 7, there is illustrated a block daigram of a mapping radar. There is provided a scanning antenna 40, antenna drive means 41, a radar transmitter 42, a monopulse receiver 43 and a display indicator 44, all constructed and arranged to cooperate by means well understood in the art to function as an airborne mapping system. As described, such arrangement would provide a plan position indication (PPI) display similar to that shown in FIG. 8, representing a point of land or land's end at an extremity of which is a lighthouse, the indication of which is confused with the return from prominences proximate thereto and having a similar backscatter coefficient (i.e., providing a radar return of similar strength). FIG. 8, further represents a coast line of such land, the indication of shoreline cliffs of which is confused with the return from the surf. Similarly, the indication in FIG. 8 as a ship at anchor in a small bay is confused with the sea return from the water in which the ship is situated. Such confusion in the display is avoided by improvements included in the system of FIG. 7. There is further provided in FIG. 7, a target extent computing means 45 similar to that described and illustrated in FIG. 5. Of course, the electronic antenna tracking loop of FIG. 5 would not be employed in the scanning mode associated with a mapping application; nor is its absence critical, as will be explained more fully hereinafter. The output of extent computer 45 is fed to display indicator 44 to provide a brightener or display attenuation control signal, whereby the brightness of portions of the PPI display is increased in response to the vertical extent or size of the targets producing such portions of the display. In this way, the shoreline cliffs of FIG. 8, can be more readily distinguished from the surf, as shown in FIG. 9; the lighthouse of FIG. 8, can be easily distinguished in FIG. 9 from surrounding land areas having like backscatter coefficients, as shown in FIG. 9; and the ship of FIG. 8, can be more readily distinguished in FIG. 9 from the sea-return around it.

The use of brightness control signals applied to one or more control grids of a display indicator such as a cathode ray display tube is well-known to those skilled in the art. Accordingly, such feature is illustrated in FIG. 7 in functional block form only.

Because the extent signal is used only for low-discrimination or coarse display brightness control, the possible signal channel cross-coupling in the extent computer (due to the absence of an electronic antenna tracking loop) is not deemed critical.

Another application of the monopulse extent measuring means of FIG. 5 is the selective tracking of a specific target of preselected extent characteristics from among a group of multiple targets containing such specific target. Such an application is of significance in discriminating between a detected aerial target such as a ballistic missile and a covey of radar decoy devices in the company of such target. Such preselected extent characteristics may be employed to provide early and certain identification of the desired target and to prevent lock-on or antenna tracking of false target. Such functions may be accomplished by gating the antenna tracking loop of a tracking antenna system, as shown in FIG. 10.

Figure 10:
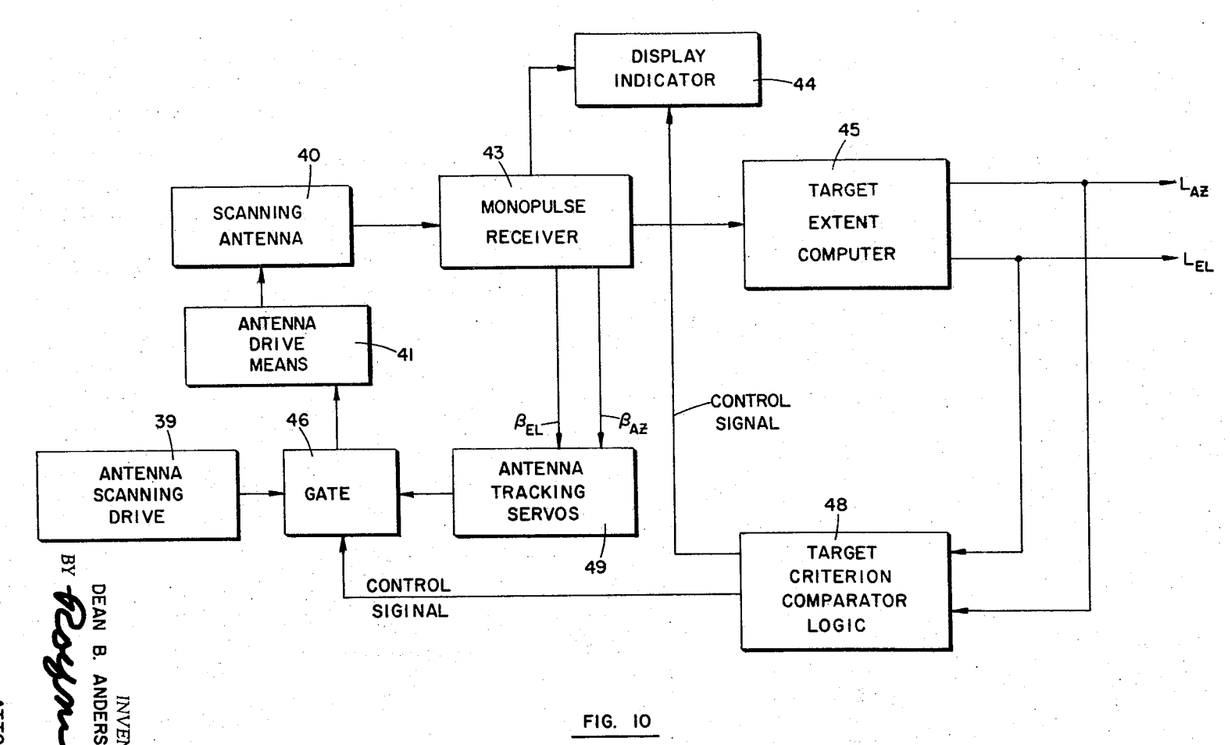
FIG. 10 is a block diagram of an alternate embodiment of the invention.

Referring to FIG. 10, there is illustrated a tracking radar including a dual plane monopulse receiver employing an alternate concept of the invention. There is provided a scanning antenna 40, antenna drive means 41, monopulse receiver and target extent computer 45 constructed and arranged to cooperate as like referenced means of FIG. 7. There are further provided an antenna scanning drive 39 and a dual plane antenna tracking loop for alternatively cooperating with a logic gate 46 for controlling the antenna drive means 41. The dual plane antenna tracking loop is comprised of antenna tracking servos 47 response to elevation and azimuth signals generated by monopulse receiver 43 and indicative of the mutually orthogonal components of a target angle-off-boresight. Such antenna tracking loops may also comprise the tracking loop arrangement of FIG. 5.

There is also provided target criterion comparator logic 48 responsively connected to computer 45 for generating a two-state switching control signal indicative of the presence of a detected target having certain preselected size characteristics. An exemplary form of logic device will be described more fully hereinafter. A signal gating means 46 is provided for alternatively connecting the outputs of antenna scanning drive means 39 and antenna tracking signal means 47 to antenna drive means 41, in response to the switching control signal from comparator 48. The construction and arrangement of signal gating means as switching devices to perform such function is well known to those skilled in the art. Therefore, gating means 46 is shown in block form only.

In a normal mode of operation, logic gate 46 responsively connects the input of antenna drive means 41 to scanning drive 39, thereby causing antenna 40 to scan or search a preselected sky sector or volume-under-surveillance. If a target is detected, target extent computer 45 (in cooperation with monopulse receiver 43) will provide signals indicative of the target extent in, say, elevation and azimuth. Such extent signals are fed to a target criterion comparator or similar logic means 48 for comparing such signals with reference signals corresponding to selected target sizes or extent criterion for providing a two-state control signal. The coincidence of the extent signals with such extent criterion produces a specific state in the two-state control signal, which causes logic gate 46 to disconnect antenna scanning drive 39, and to connect the antenna tracking servos to the input of antenna drive means 41. Hence, during the interval of the coincidence between the criterion signals and the target extent signals, scanning antenna 40 and antenna tracking servos 47 cooperate in the manner of an antenna tracking loop, as is well-understood in the tracking-radar art. An output from comparator 48 may also be used to control the display of display indicator or other signal utilizing means for providing a distinguishing contrast or gating of data signals indicative of preselected types of targets from other targets, similar to the means described and illustrated in FIG. 7.

The more data that is obtainable concerning a target's signal, the more readily such target or class of target can be distinguished from other targets or other types of targets. For example, a target that is spinning about a radar axis or line-of-right between the radar receiver and the target presents the same fixed backscatter coefficient and target size as targets which are not spinning. Hence, due to the inertial or ballistic characteristics of the target, such target may display a given spin velocity which may cause the elevation and azimuth components of its size or extent to cyclically vary at a frequency indicative of such spin characteristics. Further, the separation of a warhead from a missile airframe in a terminal guidance maneuver may result in a characteristic tumbling of the airframe, due to the aerodynamic instability and ballistic characteristics of the separated airframe alone. Such airframe tumbling, would normally occur at a lower frequency than the spinning of a ballistically balanced warhead, as to produce airframe elevation and azimuth extent signals whose amplitude varies at a lower modulation frequency than those of the warhead. Hence, frequency comparison means may also be employed in the comparator 48 by means well understood in the art for further discrimination of the target-to-be-tracked from among a group of multiple targets, as shown in FIG. 11.

Figure 11:
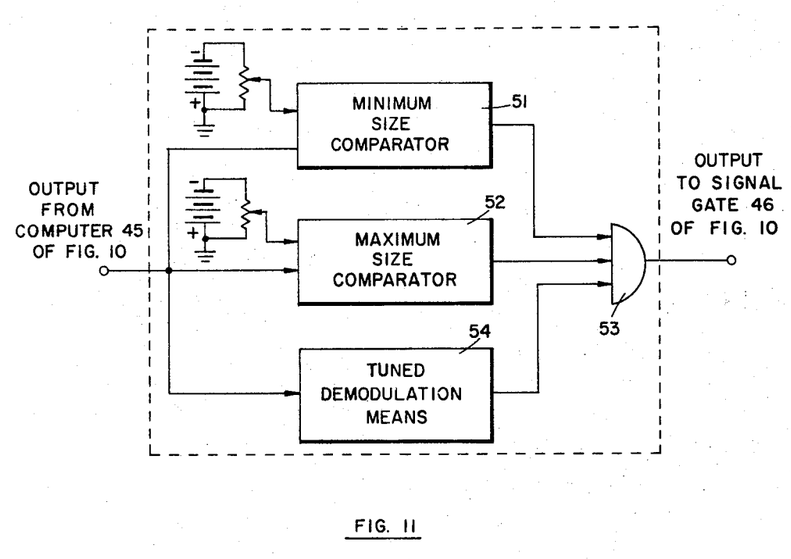
FIG. 11 is a block diagram of the target criterion comparator means employed in the device of FIG. 10.

Referring to FIG. 11, there is shown an exemplary embodiment of the target criterion comparator 48 of FIG. 10. There is provided an input terminal 50 adapted to be connected to a unipolar source of a target lineal extent signal, such as computer 45 in FIG. 10. There is also provided a minimum size comparator 51 responsively connected to terminal 50 for generating a two-state signal indicative of the presence of a target greater than a preselected minimum size or lineal extent. A maximum size comparator 52 is also provided for generating a two-state signal indicative of the absence of detected targets greater than a preselected maximum size. The construction and arrangement of comparators 51 and 52 is well-known in the art, being illustrated for example, in FIG. 6.27a on page 298 of "Electronic Analog Computers" by Korn and Korn (2nd edit.), published by McGraw-Hill (1956). Therefore, comparators 51 and 52 are shown in block form only.

The outputs of comparators 51 and 52 are fed to "AND" gate 53 or like signal coincidence means, well-known in the art, whereby a logic signal is provided which is indicative of the presence of a detected target having a size lying within a predetermined range of sizes.

There is also provided in FIG. 11, tuned demodulation means 54 comprising a band pass filter and saturable detector-amplifier or like means well-known in the art for providing a two-state signal indicative of the presence of a modulated signal having a modulation frequency lying within a preselected frequency band. Such two-state signal is fed to coincidence gating means 53, whereby the two-state output of AND gate 53 provides a switching signal indicative of a target having a size lying within a predetermined range of sizes, which dimension is modulated at a frequency lying within a preselected band of frequences.

Although specific sum-and-difference monopulse means has been described at length for measuring target transverse extent, the concept of the invention is equally applicable to other monopulse receiver types. Target angular extent measurement utilizes the quadrature component of the odd distribution characteristic of a received signal, which quadrature component has been conventionally discarded in the monopulse art. Hence, by using means responsive to such quadrature component, as taught by the subject invention, the transverse extent of a small detected target may be determined.

Hence, it is to be appreciated that novel and most useful monopulse receiving means has been described for generating and employing radar signals indicative of the size of small targets lying wholly within the antenna beamwidth of the radar.

Although the invention has been described and illustrated in detail, it is clearly understood that the same is by way of illustration and example only, and is not to be taken by way of limitation, the spirit and scope of this invention being limited only by the terms of the appended claims.

I claim:

1. In a monopulse receiver, means for determining the quadrature signals in radar return signals and means for determining target extent from such quadrature signals.

2. The combination recited in claim wherein said means for determing target extent comprises means for multiplying said quadrature signals by range and wherein is further included means for indicating said target extent.

3. In a monopulse receiving system including means responsive to received signals for providing a first and second output indicative of the sum and difference respectively of said received signals, means for determining the size of a small detected target which lies wholly within the beamwidth of the antenna comprising
   a phase detector responsive to said sum and difference signals for providing a signal indicative of the angular extent of said detected target, and
   a quadrature phase shifter interposed at one of the two inputs to said phase detector.

4. The device of claim 3 in which there is further included
   means for generating a signal indicative of the range of the detected target, and
   multiplier means responsive to said angular extent signal and said range signal for providing an output signal indicative of the lineal extent of said target.

5. In a monopulse receiving system having an antenna for providing a first and second received signal, means for measuring the size of a small detected target which lies wholly within the beamwidth of the antenna comprising
   means responsive to said first and second received signals for providing a first and second output indicative of the sum and difference respectively of said first and second received signals,
   a phase detector responsive to the component signals of said sum and difference signals which are in quadrature, for providing a signal indicative of the angular extent of said detected target.

6. The device of claim 5 in which there is further included
   signal means for generating a signal indicative of the range of the detected target, and
   multiplier means responsive to said angular extent signal and said range signal for providing an output signal indicative of the lineal extent of said target.

7. In a monopulse receiving system having an antenna for measuring two mutually orthogonal components of target angle-off-boresight in two mutually orthogonal planes, means for measuring the size of a small detected target which lies wholly within the beamwidth of the antenna comprising
   hybrid means responsive to said first and second received signals for providing a first and second output indicative of the sum and difference of the said first and second received signals,
   target angle detector means responsive to said sum and difference signals for providing antenna tracking signals,
   antenna tracking means responsive to said antenna tracking signals for controlling the boresight axis of said antenna to a detected target,
   phase detector means responsive to said sum and difference signals for providing signals indicative of mutually orthogonal components of the angular extent of said detected target, and
   quadrature phase shifter means interposed at one of the two inputs to each said phase detector.

8. The device of claim 7 in which there is further included
   signal means for generating an analog signal indicative of the range of the detected target, and
   multiplier means responsive to said angular extent signals and said analog range signal for providing output signals indicative of the mutually orthogonal components of the lineal extent of said target.

9. In a monopulse receiving system having means for providing a first and second output signal indicative of the sum and difference respectively of two reecived signals, means for indicating the size of a detected target comprising
   signal utilizing means responsively connected to said first mentioned means,
   phase detector means responsive to said sum and difference signals for providing signals indicative of the angular extent of said detected target,
   quadrature phase shifter means interposed at one of the two inputs to said phase detector,
   analog means for generating an analog signal indicative of the range of the detected target,
   multiplier means responsive to said angular extent signals and said analog range signal for providing output signals indicative of the mutually orthogonal components of the lineal extent of said target, and
   signal coupling means operatively connecting the output of said multiplier means to said signal utilizing means for controlling the response thereof.

10. The device of claim 9, wherein said signal coupling means comprises
    signal coincidence means responsive to said multiplier means for providing control signals indicative of the coincidence of the target lineal extent with a preselected size.

11. The device of claim 9, wherein said signal coupling means comprises
    signal coincidence means responsive to said multiplier means for providing control signals indicative of the coincidence of the frequency of a cyclically changing extent signal with a preselected frequency.

12. The device of claim 9, wherein said signal coupling means comprises
    signal logic means responsive to said multiplier means for providing a control signal indicative of the coincidence of a spatial target having a preselected size which is cyclically attenuated at a preselected modulation frequency.

13. The device of claim 9 in which there is further included means for tracking targets of a preselected size and spatial type comprising
    target angle detector means responsive to said sum and difference signals for providing antenna tracking signals,
    antenna tracking means responsive to said antenna tracking signals for controlling the boresight axis of said antenna to the detected target,
    signal logic means responsive to said multiplier means for providing a control signal indicative of the presence of a target of a preselected extent characteristics,
    signal gating means responsive to said control signal for gating said antenna tracking signals.

14. In a dual plane monopulse receiving system having means for providing signals indicative of the sum and difference of a plurality of received signals, means for indicating the size of a detected target comprising
    signal utilizing means responsively connected to said first mentioned means,
    phase detector means responsive to said sum and difference signals for providing signals indicative of mutually orthogonal components of the angular extent of said detected target, and quadrature phase shifter means interposed at one of the two inputs to each said phase detector, analog means for generating an analog signal indicative of the range of the detected target, multiplier means responsive to said angular extent signals and said analog range signal for providing output signals indicative of the mutually orthogonal components of the lineal extent of said target, and signal coupling means operatively connecting the output of said multiplier means to said signal utilizing means for controlling the response thereof.

15. The device of claim 14 in which there is further included means for tracking targets of a preselected size and type comprising target angle detector means responsive to said sum and difference signals for providing antenna tracking signals, antenna tracking means responsive to said antenna tracking signals for controlling the boresight axis of said antenna to the detected target, signal logic means responsive to said multiplier means for providing a control signal indicative of the presence of a target of preselected spatial extent characteristics, signal gating means responsive to said control signal for gating said antenna tracking signals.

References Cited
UNITED STATES PATENTS 2,914,762    11/1959    Cross et al. _________ 343—16.1

RODNEY D. BENNETT, *Primary Examiner.*

CHESTER L. JUSTUS, *Examiner.*

R. E. KLEIN, J. P. MORRIS, *Assistant Examiners.*